(12) United States Patent
Edgecomb et al.

(10) Patent No.: US 8,842,100 B2
(45) Date of Patent: *Sep. 23, 2014

(54) CUSTOMER AUTHORING TOOLS FOR CREATING USER-GENERATED CONTENT FOR SMART PEN APPLICATIONS

(71) Applicant: Livescribe Inc., Oakland, CA (US)

(72) Inventors: Tracy L. Edgecomb, Berkeley, CA (US); Andrew J. Van Schaack, Nashville, TN (US); James L. Marggraff, Lafayette, CA (US)

(73) Assignee: Livescribe Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/138,861

(22) Filed: Dec. 23, 2013

(65) Prior Publication Data

US 2014/0111489 A1    Apr. 24, 2014

Related U.S. Application Data

(63) Continuation of application No. 12/129,542, filed on May 29, 2008, now Pat. No. 8,638,319.

(60) Provisional application No. 60/940,669, filed on May 29, 2007.

(51) Int. Cl.
*G06F 3/033* (2013.01)
*G06F 17/00* (2006.01)
*G06F 3/0354* (2013.01)
*G06F 3/0488* (2013.01)
*G06F 3/038* (2013.01)
*G06F 3/16* (2006.01)

(52) U.S. Cl.
CPC .............. *G06F 3/03545* (2013.01); *G06F 3/16* (2013.01); *G06F 3/0488* (2013.01); *G06F 3/038* (2013.01)
USPC ........................... 345/179; 715/200; 715/202

(58) Field of Classification Search
USPC .................................................. 345/179–184
See application file for complete search history.

(56) References Cited

U.S. PATENT DOCUMENTS 5,561,446 A    10/1996  Montlick
6,130,666 A *  10/2000  Persidsky ...................... 345/179

(Continued)

FOREIGN PATENT DOCUMENTS

JP    2005-292958    10/2005
JP    2007-171970    7/2007

(Continued)

OTHER PUBLICATIONS

PCT International Search Report and Written Opinion, PCT Application No. PCT/US2010/041981, Feb. 23, 2011, seven pages.

(Continued)

*Primary Examiner* — Amare Mengistu
(74) *Attorney, Agent, or Firm* — Fenwick & West LLP

(57) ABSTRACT

In a pen-based computing system, a user-specific smart pen application is created from a template application using customer authoring tools. The template application contains computer program code that is to be executed by a processor of a smart pen. Application content and a representation for printed content are received. The application content, provided by user or customer, defines functional interactions between the printed content representation and a smart pen. The template application is combined with application content to generate a user-specific application comprising instructions for being executed on a processor of a smart pen. The user-specific application is stored on a storage medium.

20 Claims, 5 Drawing Sheets

(56) References Cited

U.S. PATENT DOCUMENTS

| | | |
|---|---|---|
| 7,175,095 B2 | 2/2007 | Pettersson et al. |
| 7,281,664 B1 | 10/2007 | Thaeler et al. |
| 2002/0073088 A1 | 6/2002 | Beckmann et al. |
| 2002/0079371 A1 | 6/2002 | Bobrow et al. |
| 2004/0229195 A1 | 11/2004 | Marggraff et al. |
| 2005/0024346 A1* | 2/2005 | Dupraz et al. ............... 345/179 |
| 2005/0223318 A1 | 10/2005 | Diesel et al. |
| 2006/0031757 A9 | 2/2006 | Vincent |
| 2006/0033725 A1 | 2/2006 | Marggraff et al. |
| 2006/0066591 A1 | 3/2006 | Marggraff et al. |
| 2006/0067576 A1 | 3/2006 | Marggraff et al. |
| 2006/0067577 A1 | 3/2006 | Marggraff et al. |
| 2006/0077184 A1 | 4/2006 | Marggraff et al. |
| 2006/0078866 A1 | 4/2006 | Marggraff et al. |
| 2006/0080608 A1* | 4/2006 | Marggraff et al. ............ 345/179 |
| 2006/0080609 A1* | 4/2006 | Marggraff ................... 715/727 |
| 2006/0125805 A1 | 6/2006 | Marggraff et al. |
| 2006/0127872 A1 | 6/2006 | Marggraff et al. |
| 2006/0136974 A1 | 6/2006 | Lee et al. |
| 2006/0292543 A1 | 12/2006 | Marggraff et al. |
| 2007/0097100 A1 | 5/2007 | Marggraff et al. |
| 2007/0280627 A1 | 12/2007 | Marggraff et al. |
| 2008/0049258 A1* | 2/2008 | Moyo et al. .................. 358/3.28 |
| 2009/0024988 A1 | 1/2009 | Edgecomb et al. |
| 2009/0251441 A1 | 10/2009 | Edgecomb et al. |
| 2011/0041052 A1 | 2/2011 | Fraisl |

FOREIGN PATENT DOCUMENTS

| | | |
|---|---|---|
| KR | 10-0669243 | 1/2007 |
| KR | 10-0813948 | 3/2008 |
| WO | WO 2004/075466 | 9/2004 |
| WO | WO 2007/141204 A1 | 12/2007 |

OTHER PUBLICATIONS

PCT International Search Report and Written Opinion, PCT Application No. PCT/US2008/065162, Sep. 4, 2008, nine pages.
United States Office Action, U.S. Appl. No. 12/836,332, Dec. 9, 2011, thirteen pages.

* cited by examiner

CUSTOMER AUTHORING TOOLS FOR CREATING USER-GENERATED CONTENT FOR SMART PEN APPLICATIONS

CROSS REFERENCE TO RELATED APPLICATIONS

This application is a continuation of U.S. application Ser. No. 12/129,542, filed May 29, 2008, which claims the benefit of U.S. Provisional Application No. 60/940,669, filed May 29, 2007, which are each incorporated by reference herein.

BACKGROUND

This invention relates generally to pen-based computing systems, and more particularly to customer authoring tools for creating user-generated content for smart pen applications.

The growth and success of new media and new computing platforms is driven by tools. Important factors include the quality and usability of the tools and the uniqueness of the tools' ability to shape the new media and platforms. Often, people apply old tools that do not work well with the new media and platforms. Best practices become embedded in tools. For example, a tool may set rules about how much audio can be played without user interaction before users tend to lose interest and focus.

User-generated content (UGC) is proliferating. For example, see YouTube, Wikipedia, reality TV, blogs, and podcasts. Drivers for UGC are self-expression, expertise, relevance, personal exposure, community, income, entertainment, and sharing. Proliferation of UGC is driven by new means of distribution. Tools that facilitate distribution are driving the proliferation of UGC.

There are nascent tools supporting simple content production for paper/ink digital systems, which include tablet PCs, printers, scanners, cameras, faxes, pen-based input/output devices, copiers, audio recorders, etc. Good tools enable individuals with specific domain expertise to create great content, but accessibility of tools for new media is evolving. Typically, content is shared among groups or subgroups. Good tools do not feel like tools; they let creators focus on the content. There are new media platforms that require an entirely new way of thinking about tools. There are tools for emulating mixed media systems, but not many, and they are very limited in their abilities. New media and systems with inadequate tools have failed. Some of the causes for past failures include: the requirement of engineers to develop the content, limited distribution of the content, and expensive or inadequate quality assurance for the content.

Pen-based computing is personal, and thus creates the need for personal and customizable tools. People have tried to adapt mass market authoring tools to the pen-based platform, but it hasn't worked well because pen-based computing is based on a different paradigm from desktop computing. There are no tools available for a pen-based medium that use the pen for creating content for use on the pen or to be subsequently shared with other users of the platform. There are no tools that enable end users to create content and stand-alone applications that can run on smart pens. There are no tools that allow users to manage unique aspects of the new medium, such as dotted paper, printing, and pattern management. There are no tools that enable the creation of content and applications that straddle the worlds of smart pens and personal computers. Finally, there are no tools that allow content creators to emulate and test their content in a simulated or real environment.

Accordingly, there is a need for tools for users to create content for use in smart pen applications.

SUMMARY

Embodiments of the invention provide a system, method, and computer program product for creating a smart pen application from a template application using customer authoring tools. The template application contains computer program code that is to be executed by a processor of a smart pen. Application content and a representation for printed content are received. The application content, provided by user or customer, defines functional interactions between the printed content representation and a smart pen. The template application is combined with application content to generate a user-specific application comprising instructions for being executed on a processor of a smart pen. The user-specific application is stored on a storage medium.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of Pen-Based Computing System

Figure 1:
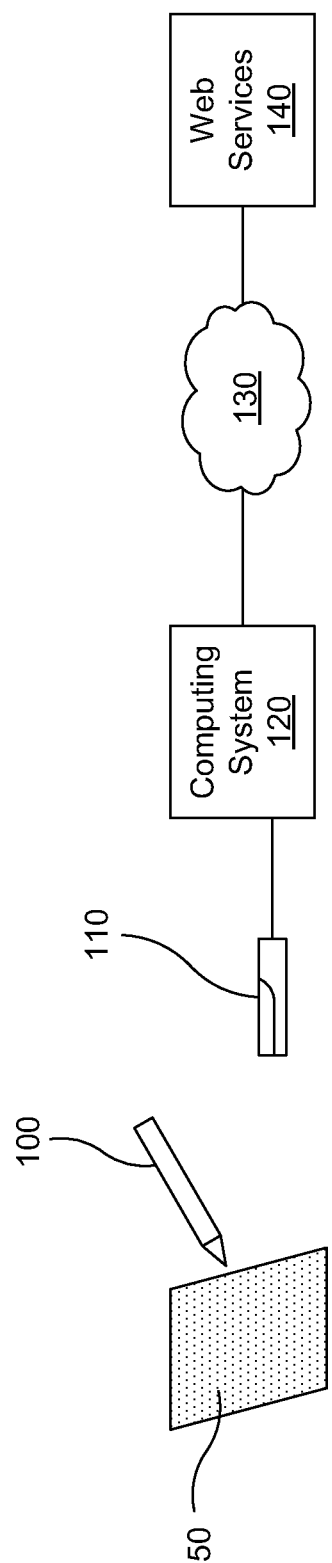
FIG. 1 is a schematic diagram of a pen-based computing system, in accordance with an embodiment of the invention.

Embodiments of the invention may be implemented on various embodiments of a pen-based computing system, and other computing and/or recording systems. An embodiment of a pen-based computing system is illustrated in FIG. 1. In this embodiment, the pen-based computing system comprises a writing surface 50, a smart pen 100, a docking station 110, a client system 120, a network 130, and a web services system 140. The smart pen 100 includes onboard processing capabilities as well as input/output functionalities, allowing the pen-based computing system to expand the screen-based interactions of traditional computing systems to other surfaces on which a user can write. For example, the smart pen 100 may be used to capture electronic representations of writing as well as record audio during the writing, and the smart pen 100 may also be capable of outputting visual and audio information back to the user. With appropriate software on the smart pen 100 for various applications, the pen-based computing system thus provides a new platform for users to interact with software programs and computing services in both the electronic and paper domains.

In the pen based computing system, the smart pen 100 provides input and output capabilities for the computing system and performs some or all of the computing functionalities of the system. Hence, the smart pen 100 enables user interaction with the pen-based computing system using multiple modalities. In one embodiment, the smart pen 100 receives input from a user, using multiple modalities, such as capturing a user's writing or other hand gesture or recording audio, and provides output to a user using various modalities, such as displaying visual information or playing audio. In other embodiments, the smart pen 100 includes additional input modalities, such as motion sensing or gesture capture, and/or additional output modalities, such as vibrational feedback.

Figure 2:
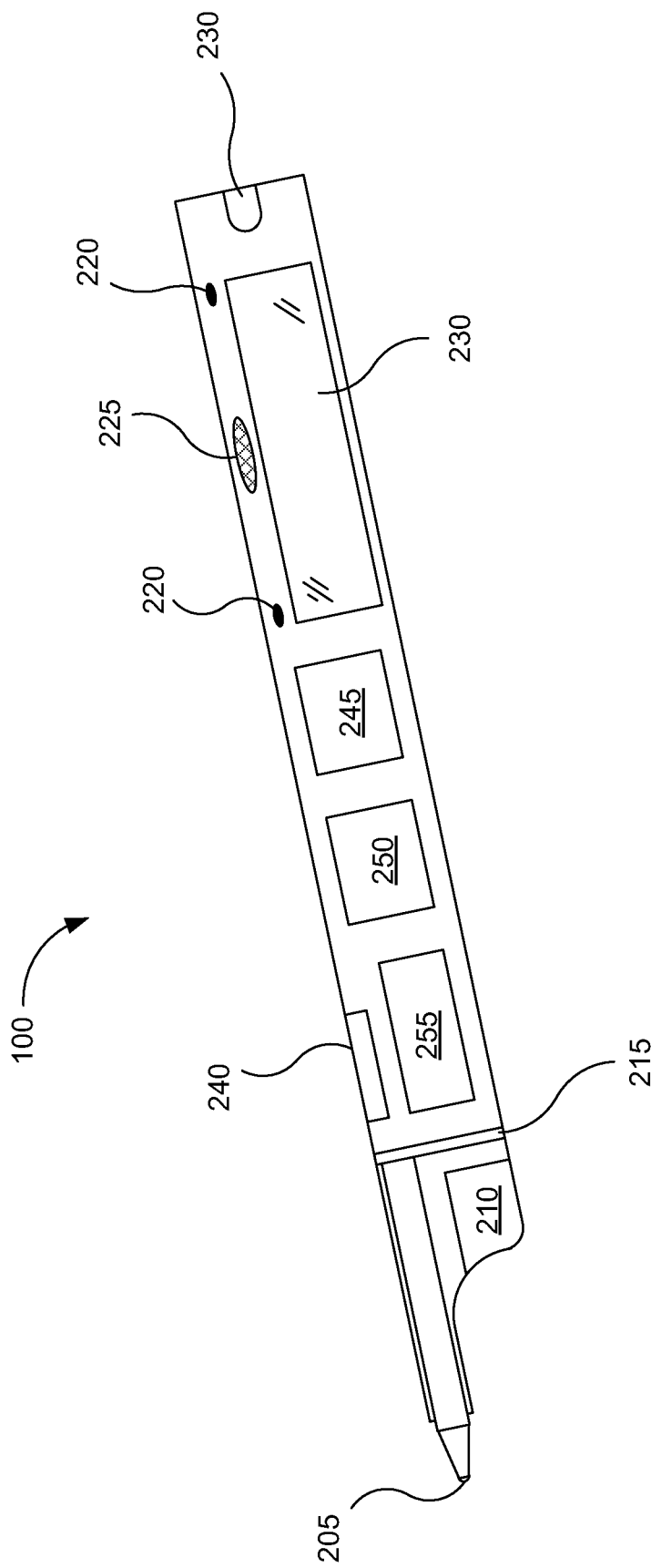
FIG. 2 is a diagram of a smart pen for use in the pen-based computing system, in accordance with an embodiment of the invention.

The components of a particular embodiment of the smart pen 100 are shown in FIG. 2 and described in more detail in the accompanying text. The smart pen 100 preferably has a form factor that is substantially shaped like a pen or other writing implement, although certain variations on the general shape may exist to accommodate other functions of the pen, or may even be an interactive multi-modal non-writing implement. For example, the smart pen 100 may be slightly thicker than a standard pen so that it can contain additional components, or the smart pen 100 may have additional structural features (e.g., a flat display screen) in addition to the structural features that form the pen shaped form factor. Additionally, the smart pen 100 may also include any mechanism by which a user can provide input or commands to the smart pen computing system or may include any mechanism by which a user can receive or otherwise observe information from the smart pen computing system.

The smart pen 100 is designed to work in conjunction with the writing surface 50 so that the smart pen 100 can capture writing that is made on the writing surface 50. In one embodiment, the writing surface 50 comprises a sheet of paper (or any other suitable material that can be written upon) and is encoded with a pattern that can be read by the smart pen 100. An example of such a writing surface 50 is the so-called "dot-enabled paper" available from Anoto Group AB of Sweden (local subsidiary Anoto, Inc. of Waltham, Mass.), and described in U.S. Pat. No. 7,175,095, incorporated by reference herein. This dot-enabled paper has a pattern of dots encoded on the paper. A smart pen 100 designed to work with this dot enabled paper includes an imaging system and a processor that can determine the position of the smart pen's writing tip with respect to the encoded dot pattern. This position of the smart pen 100 may be referred to using coordinates in a predefined "dot space," and the coordinates can be either local (i.e., a location within a page of the writing surface 50) or absolute (i.e., a unique location across multiple pages of the writing surface 50).

In other embodiments, the writing surface 50 may be implemented using mechanisms other than encoded paper to allow the smart pen 100 to capture gestures and other written input. For example, the writing surface may comprise a tablet or other electronic medium that senses writing made by the smart pen 100. In another embodiment, the writing surface 50 comprises electronic paper, or e-paper. This sensing may be performed entirely by the writing surface 50 or in conjunction with the smart pen 100. Even if the role of the writing surface 50 is only passive (as in the case of encoded paper), it can be appreciated that the design of the smart pen 100 will typically depend on the type of writing surface 50 for which the pen based computing system is designed. Moreover, written content may be displayed on the writing surface 50 mechanically (e.g., depositing ink on paper using the smart pen 100), electronically (e.g., displayed on the writing surface 50), or not at all (e.g., merely saved in a memory). In another embodiment, the smart pen 100 is equipped with sensors to sensor movement of the pen's tip, thereby sensing writing gestures without requiring a writing surface 50 at all. Any of these technologies may be used in a gesture capture system incorporated in the smart pen 100.

In various embodiments, the smart pen 100 can communicate with a general purpose computing system 120, such as a personal computer, for various useful applications of the pen based computing system. For example, content captured by the smart pen 100 may be transferred to the computing system 120 for further use by that system 120. For example, the computing system 120 may include management software that allows a user to store, access, review, delete, and otherwise manage the information acquired by the smart pen 100. Downloading acquired data from the smart pen 100 to the computing system 120 also frees the resources of the smart pen 100 so that it can acquire more data. Conversely, content may also be transferred back onto the smart pen 100 from the computing system 120. In addition to data, the content provided by the computing system 120 to the smart pen 100 may include software applications that can be executed by the smart pen 100.

The smart pen 100 may communicate with the computing system 120 via any of a number of known communication mechanisms, including both wired and wireless communications. In one embodiment, the pen based computing system includes a docking station 110 coupled to the computing system. The docking station 110 is mechanically and electrically configured to receive the smart pen 100, and when the smart pen 100 is docked the docking station 110 may enable electronic communications between the computing system 120 and the smart pen 100. The docking station 110 may also provide electrical power to recharge a battery in the smart pen 100.

FIG. 2 illustrates an embodiment of the smart pen 100 for use in a pen based computing system, such as the embodiments described above. In the embodiment shown in FIG. 2, the smart pen 100 comprises a marker 205, an imaging system 210, a pen down sensor 215, one or more microphones 220, a speaker 225, an audio jack 230, a display 235, an I/O port 240, a processor 245, an onboard memory 250, and a battery 255. It should be understood, however, that not all of the above components are required for the smart pen 100, and this is not an exhaustive list of components for all embodiments of the smart pen 100 or of all possible variations of the above components. For example, the smart pen 100 may also include buttons, such as a power button or an audio recording button, and/or status indicator lights. Moreover, as used herein in the specification and in the claims, the term "smart pen" does not imply that the pen device has any particular feature or functionality described herein for a particular embodiment, other than those features expressly recited. A smart pen may have any combination of fewer than all of the capabilities and subsystems described herein.

The marker 205 enables the smart pen to be used as a traditional writing apparatus for writing on any suitable surface. The marker 205 may thus comprise any suitable marking mechanism, including any ink-based or graphite-based marking devices or any other devices that can be used for writing. In one embodiment, the marker 205 comprises a replaceable ballpoint pen element. The marker 205 is coupled to a pen down sensor 215, such as a pressure sensitive element. The pen down sensor 215 thus produces an output when the marker 205 is pressed against a surface, thereby indicating when the smart pen 100 is being used to write on a surface.

The imaging system 210 comprises sufficient optics and sensors for imaging an area of a surface near the marker 205. The imaging system 210 may be used to capture handwriting and gestures made with the smart pen 100. For example, the imaging system 210 may include an infrared light source that illuminates a writing surface 50 in the general vicinity of the marker 205, where the writing surface 50 includes an encoded pattern. By processing the image of the encoded pattern, the smart pen 100 can determine where the marker 205 is in relation to the writing surface 50. An imaging array of the imaging system 210 then images the surface near the marker 205 and captures a portion of a coded pattern in its field of view. Thus, the imaging system 210 allows the smart pen 100 to receive data using at least one input modality, such as receiving written input. The imaging system 210 incorporating optics and electronics for viewing a portion of the writing surface 50 is just one type of gesture capture system that can be incorporated in the smart pen 100 for electronically capturing any writing gestures made using the pen, and other embodiments of the smart pen 100 may use any other appropriate means for achieve the same function.

In an embodiment, data captured by the imaging system 210 is subsequently processed, allowing one or more content recognition algorithms, such as character recognition, to be applied to the received data. In another embodiment, the imaging system 210 can be used to scan and capture written content that already exists on the writing surface 50 (e.g., and not written using the smart pen 100). The imaging system 210 may further be used in combination with the pen down sensor 215 to determine when the marker 205 is touching the writing surface 50. As the marker 205 is moved over the surface, the pattern captured by the imaging array changes, and the user's handwriting can thus be determined and captured by a gesture capture system (e.g., the imaging system 210 in FIG. 2) in the smart pen 100. This technique may also be used to capture gestures, such as when a user taps the marker 205 on a particular location of the writing surface 50, allowing data capture using another input modality of motion sensing or gesture capture.

Another data capture device on the smart pen 100 are the one or more microphones 220, which allow the smart pen 100 to receive data using another input modality, audio capture. The microphones 220 may be used for recording audio, which may be synchronized to the handwriting capture described above. In an embodiment, the one or more microphones 220 are coupled to signal processing software executed by the processor 245, or by a signal processor (not shown), which removes noise created as the marker 205 moves across a writing surface and/or noise created as the smart pen 100 touches down to or lifts away from the writing surface. In an embodiment, the processor 245 synchronizes captured written data with captured audio data. For example, a conversation in a meeting may be recorded using the microphones 220 while a user is taking notes that are also being captured by the smart pen 100. Synchronizing recorded audio and captured handwriting allows the smart pen 100 to provide a coordinated response to a user request for previously captured data. For example, responsive to a user request, such as a written command, parameters for a command, a gesture with the smart pen 100, a spoken command or a combination of written and spoken commands, the smart pen 100 provides both audio output and visual output to the user. The smart pen 100 may also provide haptic feedback to the user.

The speaker 225, audio jack 230, and display 235 provide outputs to the user of the smart pen 100 allowing presentation of data to the user via one or more output modalities. The audio jack 230 may be coupled to earphones so that a user may listen to the audio output without disturbing those around the user, unlike with a speaker 225. Earphones may also allow a user to hear the audio output in stereo or full three-dimensional audio that is enhanced with spatial characteristics. Hence, the speaker 225 and audio jack 230 allow a user to receive data from the smart pen using a first type of output modality by listening to audio played by the speaker 225 or the audio jack 230.

The display 235 may comprise any suitable display system for providing visual feedback, such as an organic light emitting diode (OLED) display, allowing the smart pen 100 to provide output using a second output modality by visually displaying information. In use, the smart pen 100 may use any of these output components to communicate audio or visual feedback, allowing data to be provided using multiple output modalities. For example, the speaker 225 and audio jack 230 may communicate audio feedback (e.g., prompts, commands, and system status) according to an application running on the smart pen 100, and the display 235 may display word phrases, static or dynamic images, or prompts as directed by such an application. In addition, the speaker 225 and audio jack 230 may also be used to play back audio data that has been recorded using the microphones 220.

The input/output (I/O) port 240 allows communication between the smart pen 100 and a computing system 120, as described above. In one embodiment, the I/O port 240 comprises electrical contacts that correspond to electrical contacts on the docking station 110, thus making an electrical connection for data transfer when the smart pen 100 is placed in the docking station 110. In another embodiment, the I/O port 240 simply comprises a jack for receiving a data cable (e.g., Mini-USB or Micro-USB). Alternatively, the I/O port 240 may be replaced by a wireless communication circuit in the smart pen 100 to allow wireless communication with the computing system 120 (e.g., via Bluetooth, WiFi, infrared, or ultrasonic).

A processor 245, onboard memory 250, and battery 255 (or any other suitable power source) enable computing functionalities to be performed at least in part on the smart pen 100. The processor 245 is coupled to the input and output devices and other components described above, thereby enabling applications running on the smart pen 100 to use those components. In one embodiment, the processor 245 comprises an ARM9 processor, and the onboard memory 250 comprises a small amount of random access memory (RAM) and a larger amount of flash or other persistent memory. As a result, executable applications can be stored and executed on the smart pen 100, and recorded audio and handwriting can be stored on the smart pen 100, either indefinitely or until offloaded from the smart pen 100 to a computing system 120. For example, the smart pen 100 may locally stores one or more content recognition algorithms, such as character recognition or voice recognition, allowing the smart pen 100 to locally identify input from one or more input modality received by the smart pen 100.

In an embodiment, the smart pen 100 also includes an operating system or other software supporting one or more input modalities, such as handwriting capture, audio capture or gesture capture, or output modalities, such as audio playback or display of visual data. The operating system or other software may support a combination of input modalities and output modalities and manages the combination, sequencing and transitioning between input modalities (e.g., capturing written and/or spoken data as input) and output modalities (e.g., presenting audio or visual data as output to a user). For example, this transitioning between input modality and output modality allows a user to simultaneously write on paper or another surface while listening to audio played by the smart pen 100, or the smart pen 100 may capture audio spoken from the user while the user is also writing with the smart pen 100. Various other combinations of input modalities and output modalities are also possible.

In an embodiment, the processor 245 and onboard memory 250 include one or more executable applications supporting and enabling a menu structure and navigation through a file system or application menu, allowing launch of an application or of a functionality of an application. For example, navigation between menu items comprises a dialogue between the user and the smart pen 100 involving spoken and/or written commands and/or gestures by the user and audio and/or visual feedback from the smart pen computing system. Hence, the smart pen 100 may receive input to navigate the menu structure from a variety of modalities.

For example, a writing gesture, a spoken keyword, or a physical motion, may indicate that subsequent input is associated with one or more application commands. For example, a user may depress the smart pen 100 against a surface twice in rapid succession then write a word or phrase, such as "solve," "send," "translate," "email," "voice-email" or another predefined word or phrase to invoke a command associated with the written word or phrase or receive additional parameters associated with the command associated with the predefined word or phrase. This input may have spatial (e.g., dots side by side) and/or temporal components (e.g., one dot after the other). Because these "quick-launch" commands can be provided in different formats, navigation of a menu or launching of an application is simplified. The "quick-launch" command or commands are preferably easily distinguishable during conventional writing and/or speech.

Alternatively, the smart pen 100 also includes a physical controller, such as a small joystick, a slide control, a rocker panel, a capacitive (or other non-mechanical) surface or other input mechanism which receives input for navigating a menu of applications or application commands executed by the smart pen 100.

System Architecture

Figure 3:
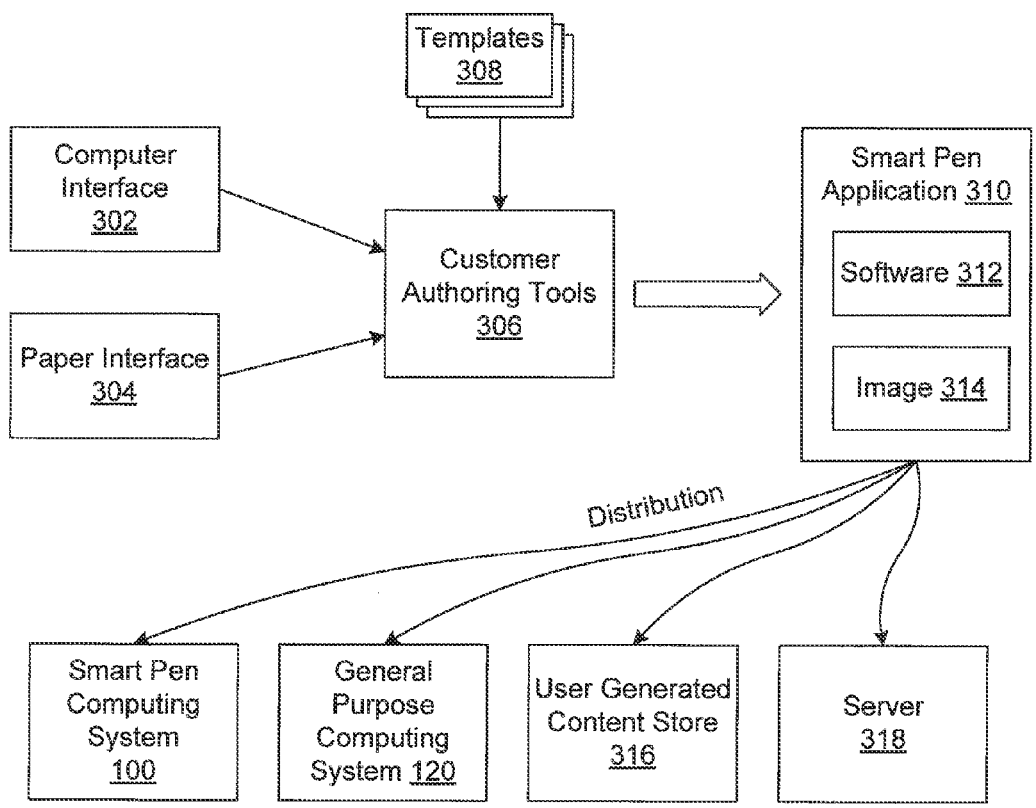
FIG. 3 illustrates a system architecture for creating and using a smart pen application, in one embodiment.

FIG. 3 illustrates a system architecture for creating and using a smart pen application, in one embodiment. The system includes customer authoring tools 308 to generate a smart pen application 310. These tools may run on the smart pen 100 or an attached computing system 120 or on both. The customer authoring tools 308 enable the author, also referred to as the customer, to choose a template 308 from a plurality of available templates. The template includes the functions for use in the smart pen application 310. The customer authoring tools 308 also enable the author to select an image 314 for the application and to select content for use by the functions of the smart pen application.

The author, also referred to as the customer, provides input to the customer authoring tools 306 through a computer interface 302 and a paper interface 304, in one embodiment. The computer interface may be provided by the general purpose computing system 120 through a desktop or web browser running on the computing system. The computer interface 302 may be used, for example, to select an application template 308, import graphics and other content, and select general functionality for the smart pen application 310. The paper interface 304 may be provided by input from the smart pen 100 used with a writing surface 50. The paper interface may be used to link locations on the writing surface 50 corresponding to locations in the image 314 with template functions to be included in the smart pen application 310. In other embodiments, the author may use only the computer interface 302 to create the smart pen application, or the user may use only the paper interface 304.

These interfaces provide the supplied content to the customer authoring tools 306, which add the content to a template application 308 to create the smart pen application 310. As mentioned, a smart pen application 310 may include software 312 that is configured to be executed by a smart pen computing system 100 and a corresponding image 314 (in electronic or paper form) that is linked to functionalities of the software when used in conjunction with a smart pen computing system. The smart pen application 310 may then be downloaded directly to the author's smart pen computing system 100 or to a smart pen management software application running on a general purpose computing system 120. The smart pen application 310 may also be distributed via a user generated content store 316, via a server 318, or via some other distribution channel.

Figure 4:
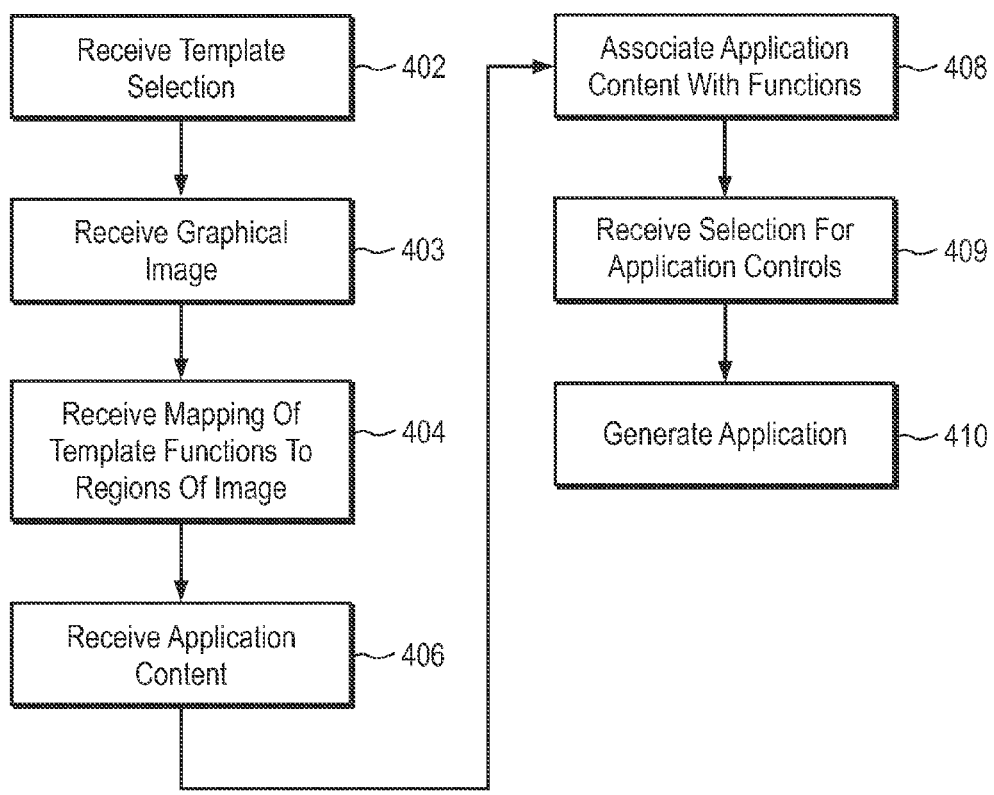
FIG. 4 is a flowchart illustrating the operation of the customer authoring tools, in one embodiment.

FIG. 4 is a flowchart illustrating the operation of the customer authoring tools 306, in one embodiment. The customer authoring tools 306 receive a template 308 selection. This selection, and the other inputs to the customer authoring tools 306 described below may be received from the computer interface 302 or the paper interface 304. The customer authoring tools 308 receive 403 a graphical image 314 and receive 404 a mapping of functions in the template 308 to regions of the image 314. The customer authoring tools 306 receive 406 content, such as graphics or audio, for the application. The content is associated 408 with the functions in the template 308. The authoring tools then receive 409 selections for buttons or other controls, such as menu items, to be included in the application 310. The application 310 is then generated 410 based on the template 308, the mapping for functions to the image 314, the content, the controls, and the image 314.

Once the application 310 is generated, the author may test it by downloading the application to a smart pen computing system 100. In another embodiment, the web-based authoring tools 306 include an emulator function, allowing the author to test run the application 310 from within the web tool, e.g., using the mouse as a pointer to explore and interact with the application as a user might use the pen on paper with the real application.

Once finalized, the application 310 may be shared or sold. The recipient or purchaser of the application 310, the user, may then download the application and associated content and install the application on their smart pen 100. The user may print the image 314 on a writing surface 50, calibrate the application 310 if necessary, and launch and use the application from the smart pen 100.

If the smart pen application 310 is designed for use with pre-printed dotted paper, a calibration method may be used to align the dotted pattern (which controls the software functionality) with the printed image 314. In one embodiment, the printed image 314 includes three predefined points. When the user launches the smart pen application 310, the application prompts the user to tap at each of the three points in succession. This gives the application three references coordinates that allow the application 310 to calibrate the printed image 314 to the application's functionality.

Customer Authoring Tools

The customer authoring tools 306 are a set of tools and applications that allow people without programming knowledge to create full, stand-alone applications and content for the smart pen 100. A variety of tools 306, as well as a variety of modes within each tool, allow authors to select from a wide range of interaction types and to create a wide array of different smart pen applications 310.

The tools 306 may guide the author through a step-by-step process that safeguards both the application creation process and the resulting smart pen application. In one embodiment, back-end functions in the tools 306 validate and check the applications created by authors and offer pointers or corrections to the authors. This means that content and applications 310 created by the tools 306 can be trusted by consumers to run safely on smart pen computing systems 100. It also means that authors can greatly reduce the amount of testing and manual validation required for applications 310 created with the authoring tools 306.

The tools 306 may contain structural information about the flow and type of the application 310 or experience that can be created with each tool, but the content to be added is completely open to the author; thus, the same tool could be used to create a "name the US States" game, a study tool for anatomy, or a treasure hunt that guides players around a specific college campus. The tools 306 may provide simple graphics tools to allow authors to create art that will be provided as part of the finished application 310, or authors may import their own full-color graphics.

As mentioned above, the authoring tools 306 may be run from the general purpose computing system 120 (e.g., from the web or as a desktop application), or on the pen device 100 itself. Also, combinations of tool locations may be used. For example, an author may draw graphics content on a writing surface 50 with a pen device 100, then upload those graphics to the desktop on the computing system 120 where the author assigns functions to the designs (or regions of the designs). The partially complete application 310 is then moved to a web tool to incorporate audio from a library of pre-recorded sound effects. The finished application 310 would include the information created on all three mediums. In one embodiment, the smart pen application 310 is created solely using a smart pen 100 itself, where the customer authoring tools 306 are implemented as another smart pen application 310, and the user makes selections and adds content using a smart pen instead of a personal computer 120.

The authoring tools 306 may support the ability for authors to create overlapping templates 308 that allow the same regions of an image 314 to be used for two or more different activities. For example, an image 314 could include a tap-and-play mode for users to explore the information, then a quiz mode that calls out regions and asks the user to find them. In one embodiment, authors could either use the same region shaping as was used for a previous template 308, or add new shaping information, or both. The user of the smart pen application 310 then indicates which function they wish to access, e.g., using mode buttons.

The authoring tools 306 may include features to assist with and improve the preparation of images 314 on a dot-enabled writing surface 50 for use with the pen applications 310. For example, certain colors that are not compatible with the dot pattern (e.g., due to technical limitations in the smart pen computing system's ability to read the pattern in the presence of a particular color) may be automatically removed or dimmed within the author's image 314. This could include "punch-outs" where the image 314 is removed or dimmed only where it coincides with an active region, and in other areas, where the pen 100 will not be used to access information embedded in the dots, the image 314 can be left at full strength. Alternatively, a warning could be triggered that instructs the author that there could be problems with the image 314 and instructs them how to change the image to improve the functionality with the pen 100 once it is printed.

In one embodiment, the tools 306 may also provide templates 308 that allow the end user of the application 310 to interact with the application while writing or drawing on paper 50 with other coding (or dot) patterns, which is not predefined or known by the smart pen application 310. A smart pen application 310 may use this feature in addition to predefined image 314 and known dot patterns, or on their own without the need for any printed image 314.

Templates for Different Types of Smart Pen Applications

The types of templates 308 available determine the types of applications 310 that may be created. Each template 308 is designed around a specific interaction type, although a given template may be used for many different styles of smart pen application 310 as determined by the type of content added by the author. For example, the same template 308 could be used to generate a game, quiz, study tool, or reference guides.

Templates 308 may be highly targeted to a specific use, in which case many of the features and options will be hardwired. This decreases the amount of customization that is possible for the author, but it also makes it easier to create an application 310, as there is less for the author to think about. Other templates 308 may offer many options and settings for the author to choose from, allowing a great variety of applications 310 to be created from a single template.

In one embodiment, each template 308 has two components: a web tool and a smart pen shell application. The author uses the web tool to map out the functions and flow of the application, as well as to include any custom art, audio, and/or data in the application. The tool then creates a data file that is loaded into the matching smart pen shell application to produce the finished application 310.

New templates 308 may be created over time and added to the set of templates accessible by the customer authoring tools. This feature makes the customer authoring tools 306 highly extensible. Especially with a web-based tool system, new templates 308 can easily be added, and these new templates may be used to create new and different types of pen applications 310. Those applications 310 can then be used seamlessly by existing smart pens 100.

The table below includes a number of example templates 308 that may be used with certain embodiments of the invention.

| Application Type | Description | Possible Use |
| --- | --- | --- |
| Simple Tap and Play | Tap in a region to play audio or display text | Adding information to diagrams, maps, graphs, charts, or any other printed material |
| Branching Tap and Play | Responses to each tap change based on previous taps | Diagnostic tool (e.g. "Do you have this symptom?") Quizzes, games (e.g. "21 Questions.") |
| Record and Playback | Listen to sample audio, then record the same thing yourself; tap back and forth to compare | Pronunciation practice (e.g. foreign language or medical terminology) |
| Multiple Choice Quiz - Buttons | Pen displays questions and answers; tap on a button (e.g. "A" "B" or "C") to answer; score displayed at end | Study aid (e.g.: "Was this play written by Shakespeare, Ben Jonson, or someone else?") |

-continued

| Application Type | Description | Possible Use |
|---|---|---|
| Multiple Choice Quiz - Graphics | Pen displays questions; tap on answers within the picture; score displayed at end | "Find all the plays written by Euripides" |
| Matching Game | Tap an item in the picture, then tap its match; score displayed at end | Terms and definitions<br>Dates and events<br>Equations and solutions |
| Find All The . . . | Application presents a question; user taps on all the matching items in the graphic | Identification games (e.g., tap all Noble Gases in the Periodic Table) "Hocus Focus" game (e.g., tap all differences between two pictures) |
| Spatial Exploration | Location-based exploration<br>Support for navigation (up/down, north/south)<br>Support for items present at locations<br>Simple command set (go, take, drop, look) | Text adventure games (e.g., Zork, "My Campus" games)<br>Process/flow exploration (e.g., digestive system flowchart) |
| Info Look-Up by Index | Enter page number, question number, etc.; and application displays relevant information | Information tied to specific sources (e.g., textbook quizzes- enter textbook page number to get answers or tips for that chapter) |
| Word or Phrase Look-Up | Write a word or phrase on Open Paper, and application displays information or definition | Glossary or definitions list within a specific topic |
| Categorization Game | Write two category names at top of page; as each item is shown on display, tap the category it belongs to; score displayed at end | Quizzes and games (e.g., Axis or Ally?, Masculine or Feminine noun?, Greek or Latin root?, Base or Alkaline? |
| Timeline | Draw a horizontal line in Open Paper; application provides historical events and user places them in position on timeline; application corrects placement and gives additional information; once timeline is complete, application quizzes user on info | Historical timelines<br>Ordered processes |
| Word of the Day (or Poem of the Day, Quote of the Day . . .) | Subscription service that places new content on the pen each day/week/etc.; user invokes app, either by tapping on a printed button or writing a command; pen displays the content tagged to that day | Fun facts (e.g., famous people born on this day)<br>Educational information (e.g., new vocabulary word of the day)<br>Timely information (e.g., movie listings, weather forecasts) |
| Memory Game | User taps on regions on a page to listen to audio and/or display information on the pen. User is looking for matches between pairs or sets of items. As each pair or set is found, it is removed from the game. Game continues until all pairs or sets are found. | Memory matching game, where pairs of identical sounds are matched. Question/answer game where complementary regions are matched, for example "California" and "Sacramento" are a match. Another example is a match between a famous quote and the name of its author.<br>One example of a game using sets rather than pairs is one in which each region contains a different conjugation of a verb. The user tries to match three regions using the same basic verb. For example, "estas", "estan", and "estamos" are all part of the same set, as are "vivo", "vivimos", and "viven". |
| Multi-Modal | Combinations of the above templates; user taps on a mode button to select between different ways of interacting; the graphics and/or regions can be shared between modes | Browse and explore (e.g., by tapping on a map of the United States, then get quizzed.)<br>Hear phrases in one language, then change modes to hear them in another. |

Creating an Example Smart Pen Application

Figure 5:
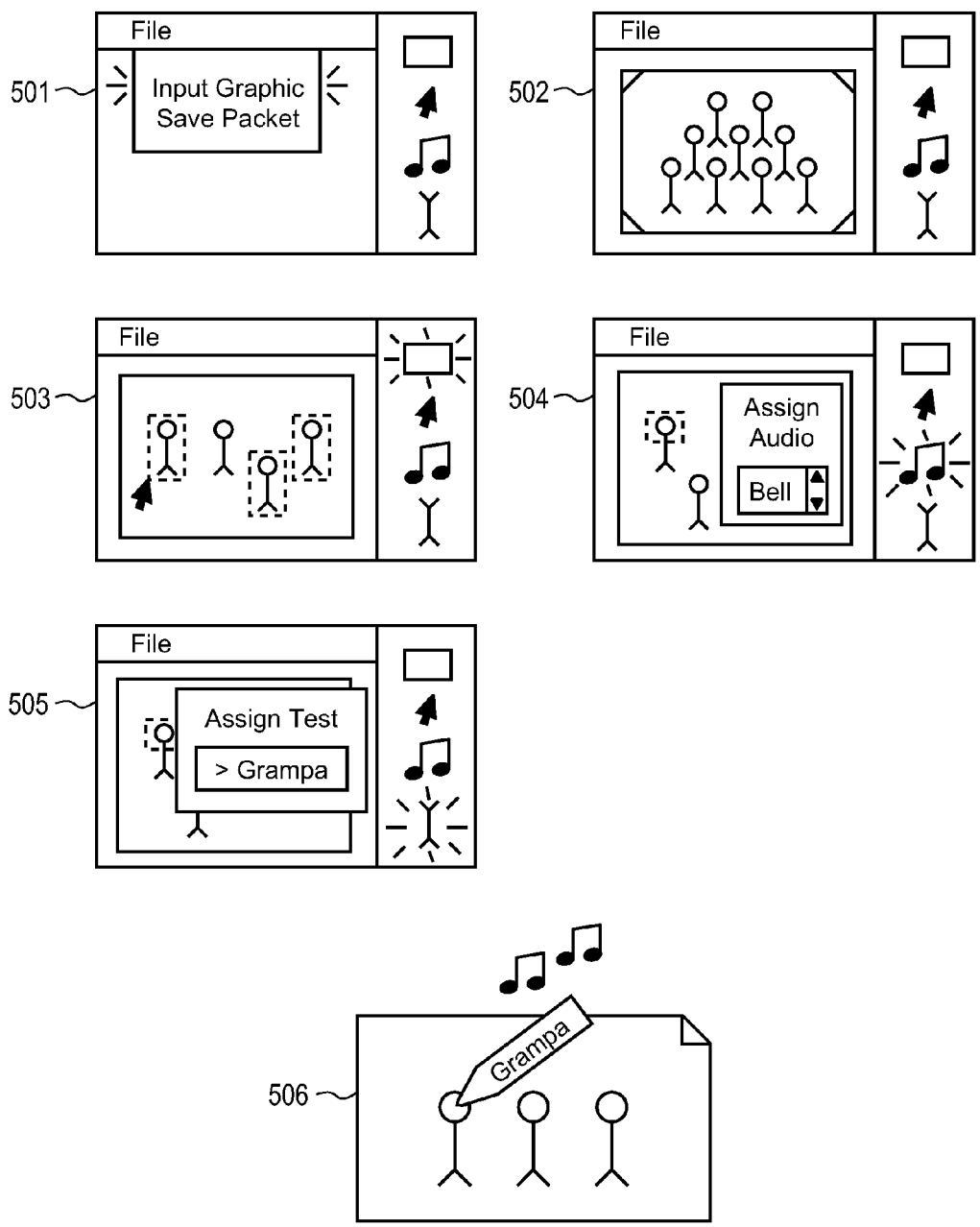
FIG. 5 illustrates an example process for authoring a "tap and play" type application.

FIG. 5 illustrates an example process for authoring a "tap and play" type application 310, as listed above. In step 501, the author imports an image 314 in a graphics file using the computer interface 302. The result of importing the image 314 is shown in step 502, where the author has imported a family reunion snapshot. In step 503, the author defines active regions within the picture, to which the author can later assign a simple functionality. The active regions are shown by dotted lines. In step 504, for example, the author assigns the functionality of playing a sound file by clicking on the musical note and selecting the file from a file browse dialog box shown in connection with one of the active regions. This results in the smart pen application 310 playing the selected sound file when a user taps this active region with a smart pen 100 on a printout of the image 314. In step 505, the author assigns the text "Grandpa" to another active region corresponding to an area of the image 314 where the grandfather is located. This results in the smart pen application displaying "Grandpa" when a user taps this active region with a smart pen 100 on a printout of the image 314. The "Grandpa" text may be displayed on a display 235 of the smart pen 100. In step 506, after the application 310 has been created and the image 314 printed onto dot-enabled paper, a user can realize these assigned functionalities when the user taps on the defined active regions of the image 314 with a smart pen 100.

It can be appreciated that this is just one example, and with a large number of templates 308 and an unlimited set of content from different authors, many different applications 310 can be authored for a great many different purposes.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for generating printable content associated with a smart pen application, the method comprising:
    receiving, at a computing system, a representation of printable content;
    determining that a portion of the representation of the printable content is incompatible with a dot pattern on a writing surface, wherein the portion of the representation of the printable content will interfere with a smart pen detecting the dot pattern on the writing surface when the portion of the representation is printed to the writing surface having the dot pattern;
    responsive to determining that the portion of the representation of the printable content is incompatible with the dot pattern on the writing surface, modifying the portion of the representation so that it does not interfere with detection of the dot pattern by the smart pen when the portion of the representation is printed to the writing surface.

2. The method of claim 1, wherein determining that the portion of the representation is incompatible with the dot pattern on the writing surface comprises determining that a color of the representation of the printable content is incompatible with a color of the dot pattern of the writing surface.

3. The method of claim 2, wherein modifying the portion of the representation comprises dimming the color of the representation to a color that is compatible with the dot pattern.

4. The method of claim 1, wherein receiving the representation of printable content comprises importing an image.

5. The method of claim 1, wherein receiving the representation of printable content comprises receiving a selection for constructing an image.

6. The method of claim 1, further comprising:
    receiving a selection of a template application from a plurality of template applications, wherein the representation of printable content is based on the template application.

7. The method of claim 6, wherein the template application comprises a plurality of user-assignable smart pen functions, each user-assignable smart pen function including a user-selected output signal to be reproduced by the smart pen, the user-selected output signal comprising at least one of:
    an audio signal to be played back by a speaker of the smart pen;

a visual signal to be displayed on a display of the smart pen; and a vibration signal to be generated by a vibrational feedback device of the smart pen.

8. The method of claim 6, wherein the template application comprises code for displaying text or graphics content on a display device of the smart pen in response to receiving a particular gesture signal from a gesture capture device of the smart pen, and wherein the printable content comprises the text or graphics content.

9. The method of claim 2, wherein the template application comprises code for playing audio content on a speaker of the smart pen in response to receiving a particular gesture signal from a gesture capture device of the smart pen, and wherein the smart pen application comprises the audio content.

10. The method of claim 2, wherein the template application comprises code for recording audio on a microphone of the smart pen and for storing the recorded audio, the recording and storing in response to receiving a particular gesture signal from a gesture capture device of the smart pen.

11. A non-transitory computer-readable storage medium storing instructions for generating printable content associated with a smart pen application, the instructions when executed by a processor causing the processor to perform steps including:

receiving a representation of printable content;

determining that a portion of the representation of the printable content is incompatible with a dot pattern on a writing surface, wherein the portion of the representation of the printable content will interfere with a smart pen detecting the dot pattern on the writing surface when the portion of the representation is printed to the writing surface having the dot pattern;

responsive to determining that the portion of the representation of the printable content is incompatible with the dot pattern on the writing surface, modifying the portion of the representation so that it does not interfere with detection of the dot pattern by the smart pen when the portion of the representation is printed to the writing surface.

12. The non-transitory computer-readable storage medium of claim 11, wherein determining that a portion of the representation is incompatible with the dot pattern on the writing surface comprises determining that a color of the representation of the printable content is incompatible with a color of the dot pattern of the writing surface.

13. The non-transitory computer-readable storage medium of claim 12, wherein modifying the portion of the representation comprises dimming the color of the representation to a color that is compatible with the dot pattern.

14. The non-transitory computer-readable storage medium of claim 11, wherein receiving the representation of printable content comprises importing an image.

15. The non-transitory computer-readable storage medium of claim 11, wherein receiving the representation of printable content comprises receiving a selection for constructing an image.

16. The non-transitory computer-readable storage medium of claim 11, further comprising computer code for:

receiving a selection of a template application from a plurality of template applications, wherein the representation of printable content is based on the template application.

17. The non-transitory computer-readable storage medium of claim 16, wherein the template application comprises a plurality of user-assignable smart pen functions, each user-assignable smart pen function including a user-selected output signal to be reproduced by the smart pen, the user-selected output signal comprising at least one of:

an audio signal to be played back by a speaker of the smart pen;

a visual signal to be displayed on a display of the smart pen; and a vibration signal to be generated by a vibrational feedback device of the smart pen.

18. The non-transitory computer-readable storage medium of claim 16, wherein the template application comprises code for displaying text or graphics content on a display device of the smart pen in response to receiving a particular gesture signal from a gesture capture device of the smart pen, and wherein the printable content comprises the text or graphics content.

19. The non-transitory computer-readable storage medium of claim 16, wherein the template application comprises code for playing audio content on a speaker of the smart pen in response to receiving a particular gesture signal from a gesture capture device of the smart pen, and wherein the smart pen application comprises the audio content.

20. The non-transitory computer-readable storage medium of claim 16, wherein the template application comprises code for recording audio on a microphone of the smart pen and for storing the recorded audio, the recording and storing in response to receiving a particular gesture signal from a gesture capture device of the smart pen.

* * * * *